United States Patent [19]

Johnson

[11] Patent Number: 4,715,503
[45] Date of Patent: Dec. 29, 1987

[54] INTERLOCKING JOINT WINE RACK

[76] Inventor: David W. Johnson, 1884 Sunset Blvd., San Diego, Calif. 92103

[21] Appl. No.: 848,573

[22] Filed: Apr. 7, 1986

[51] Int. Cl.$^4$ .............................................. A47B 73/00
[52] U.S. Cl. ..................................... 211/74; 211/189; 403/219; 273/160
[58] Field of Search .................. 211/74, 189, 105, 85, 211/182; 403/219, 364; 446/106; 273/160; 52/667; D6/467; D7/71

[56] References Cited

U.S. PATENT DOCUMENTS

| | | | |
|---|---|---|---|
| D. 278,110 | 3/1985 | Boland, II | D7/71 X |
| 1,350,039 | 8/1920 | Senyk | 273/160 |
| 1,388,710 | 8/1921 | Hime | 273/160 |
| 1,542,148 | 6/1925 | Kramariuk | 273/160 |
| 3,606,023 | 9/1971 | Edmunds | 211/74 |
| 4,148,489 | 4/1979 | Pidgeon | 273/160 |

FOREIGN PATENT DOCUMENTS

| | | | |
|---|---|---|---|
| 286156 | 2/1953 | Switzerland | 273/160 |
| 452434 | 8/1936 | United Kingdom | 403/219 |
| 1146070 | 3/1985 | U.S.S.R. | 273/160 |

OTHER PUBLICATIONS

*Washington Star Daily News*, Advertisement, 12-3-72.

Primary Examiner—Ramon S. Britts
Assistant Examiner—Blair M. Johnson
Attorney, Agent, or Firm—Ralph S. Branscomb

[57] ABSTRACT

A wine rack has no fasteners or adhesives at the three-dimensional joints, but rather the joints are all formed so that the three intersecting cross pieces interlock in such a way that a tight joint construction occurs strictly by virtue of the way the members are cut in the joint region, and the way in which the members are interlocked. The interlocking and connecting of cubic cells provides a rigid structure capable of accepting loads in any direction and allowing the rack to be mounted in any orientation, with single point wall mounting possible wherein the rack can withstand full loading with no distortion. The modular cell configuration is adapted to the construction of lattice beams and other arrangements besides wine racks.

11 Claims, 13 Drawing Figures

U.S. Patent   Dec. 29, 1987   Sheet 1 of 2   4,715,503
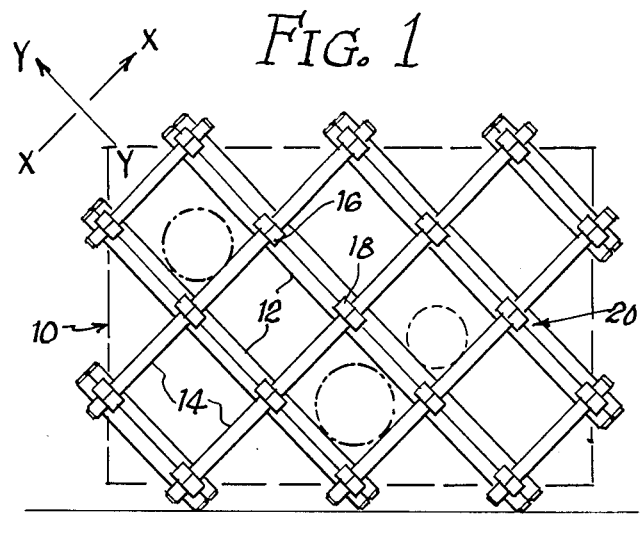
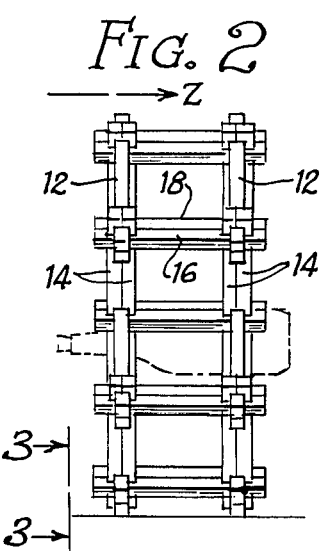
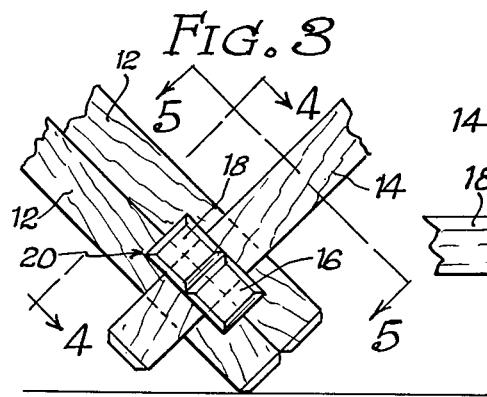
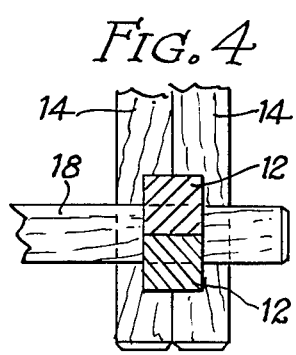
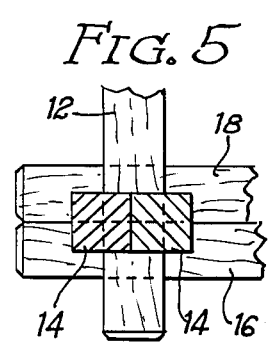
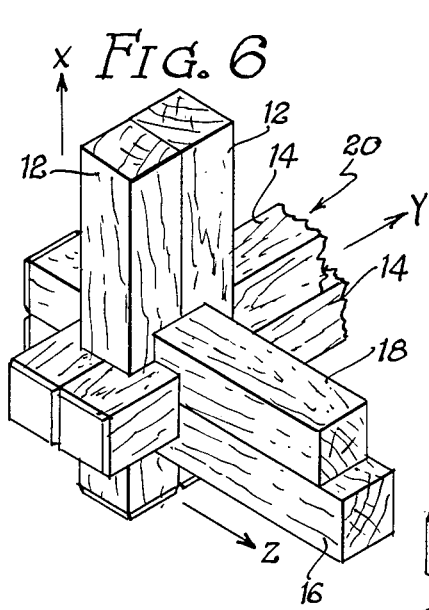
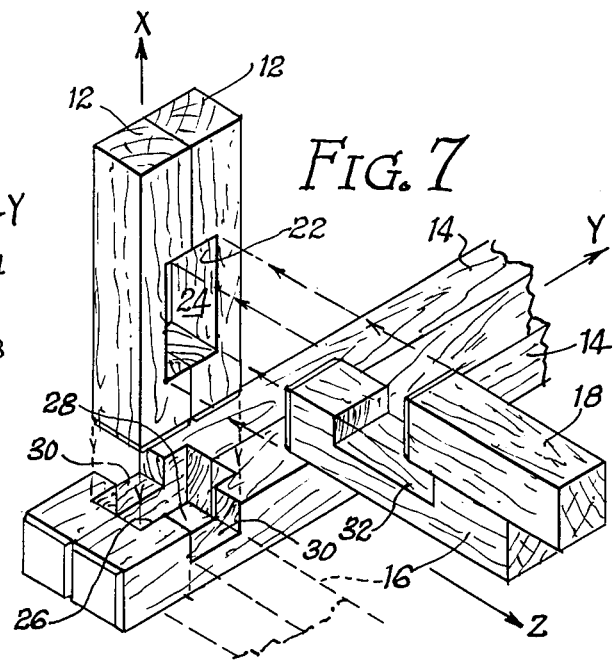

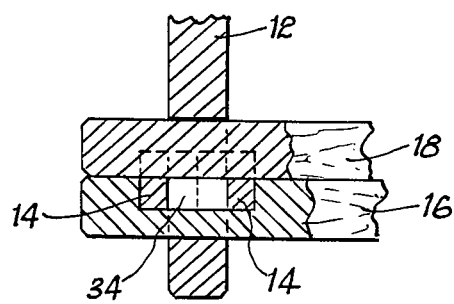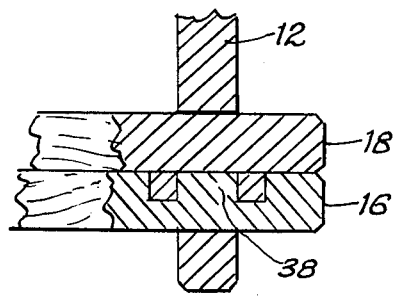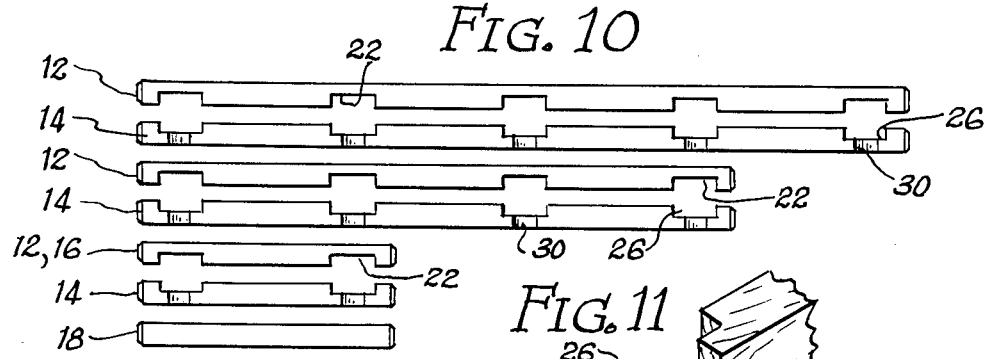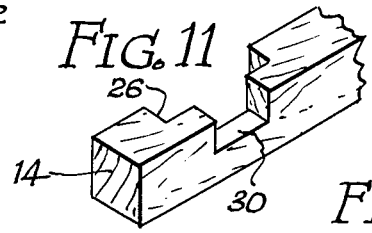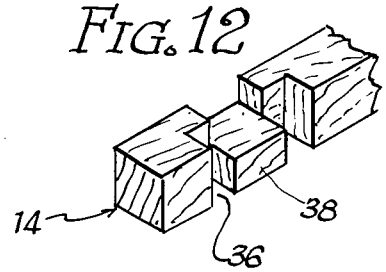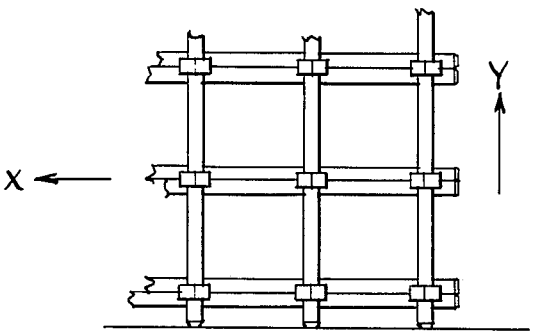

INTERLOCKING JOINT WINE RACK

BACKGROUND OF THE INVENTION

The invention is in the field of wine racks that are of the lattice type, utilizing a three-dimensional lattice to define a series of cubic cells that are two lattice layers deep to hold wine bottles. Numerous wine racks of this overall configuration have been produced according to various methods of construction, all of which use glue or fasteners of some kind at the joints.

Whereas there is certainly nothing wrong with utilizing fasteners or glue to join members together for a wine rack, and no doubt most if not virtually all of the wine racks produced in this fashion are quality pieces of merchandise or furniture, nonetheless, the appearance and the novelty of a wine rack made completely of lengths of wood or equivalent material which are so notched that they interlock at the joints to produce a complete, extremely rigid and strong wine rack with no glue or fasteners, differentiate such a wine rack considerably from the previous state of the art in wine rack construction.

SUMMARY OF THE INVENTION

Such a wine rack is the type set forth in this disclosure, as will be more fully understood by reference to the specification, drawings, and claims set forth below.

The wine rack of the instant disclosure is probably the most complex wine rack of its basic configuration ever made, and at the same time, probably about the simplest, once the construction and the intricate interfitting of the various pieces is understood. It may be the only wine rack with rigid joints ever produced without any fasteners or adhesives whatsoever, and it is also unusual in its extreme economy of labor and manufacturing such a nice piece of furniture, as well as in the economy of materials: there is only one material used in the entire rack, which is wood and all pieces have the same cross sectional shape.

The joint construction makes the rack extremely rigid, and adapted to be hung on a wall by a single point. Naturally, the invention is not limited to wood construction, and therefore plastic, metal, or other synthetic material which could be shaped basically as can wood, and has some structural strength, could be used. The same modular cell construction can be extrapolated into a myriad of other configurations.

BRIEF DESCRIPTION OF THE DRAWINGS

FIG. 1 is a front elevation view of the wine rack;

FIG. 2 is a side elevation view of the wine rack illustrating a bottle of wine as it would rest in the rack;

FIG. 3 is a front elevation view of a typical bottom joint of the rack;

FIGS. 4 and 5 are sections taken respectively along lines 4—4 and 5—5 of FIG. 3;

FIG. 6 is an isometric view of a typical joint;

FIG. 7 is an exploded view of the joint illustrated in FIG. 6, making it possible to understand how the members interlock to form the joint;

FIG. 8 illustates the internal void of the joint utilizing the preferred method of construction;

FIG. 9 is identical to FIG. 8, illustrating the way in which the internal void is filled by utilizing slats of the modified version illustrated in FIG. 12;

FIG. 10 is a plan view illustrating the three different sizes and types of pieces used in construction of the wine rack;

FIG. 11 is an isometric view of the notched area of a typical slat;

FIG. 12 is an isometric view of a modified slat with an E-type configuration so that the internal void of the joint is filled as shown in FIG. 9; and, FIG. 13 illustrates the lattice construction as it would appear if it were not rotated 45 degrees as illustrated in FIG. 1 for a wine rack.

DETAILD DESCRIPTION OF THE PREFERRED EMBODIMENT

The three-dimensional lattice of the wine rack is best understood by labeling the directions in which the various members extend, so as indicated in FIG. 1, the X and Y axes align with the directions that the members extend that define the face of the wine rack, and the depth is established by the Z direction, indicated in FIG. 2. The same type of construction could clearly be used in a similar structure illustrated in FIG. 13 in which the matrix is upright, rather than being tilted 45 degrees as in FIG. 1. The configuration of the wine rack is such that, as it is made tilted 45 degrees from the upright as shown in FIG. 1, all peripheral joints of the wine rack align with the sides of the rectangle, illustrated in part at 10.

The lattice of the rack is defined from only four different types of members in the preferred embodiment. Although they are all similar pieces of hardwood rectangular millstock in the preferred embodiment, sanded, polished and finished to produce a fine piece of furniture, in order to clarify the explanation and description, the members are given arbitrary distinguishing names which correspond with the above-mentioned directions in three dimensions in which the members run. Members running in the X direction are called "laths," and are indicated at 12, "slats" 14 run in the Y direction, and "posts" 16 and 18 run in the Z direction (there are two different kinds of posts).

All of the joints 20 are identical, in the configuration, orientation and cutting of the members that define the joints. Thus, to understand the construction of the unit, first the construction of a single joint will be described, and then the organization of the wine rack as a whole will be set forth. The joint is a variation of a "burr puzzle," which was known to craftsmen earlier in this century.

Turning to FIG. 7, the basic element of the X direction is the lath 12, and two of these laths together form the structural member that extends in the X direction. In the claims, the two laths together are defined as an "elongated structural member," as are the slat pairs and post pairs, with the individual members subsequently being defined as "split members." With that definitional aside, the members will hereafter be described singularly.

The two laths in FIG. 7 each has what is referred to as a "full notch 22," this terminology referring to a notch, which when paired with an oppositely directed notch, as shown in FIG. 7, defines a passthrough opening 24 for a pair of members which will snugly fit into the opening when inserted orthogonally therethrough. This opening is referred to as a "Z-passthrough opening" in the claims, because the opening will pass through members which run in the Z direction.

Still referring to FIG. 7, the slats 14 running in the Y direction also have full notches 26 which define an X-pass-through opening 28, through whch passes the pair of laths 12, indicated exploded away from the opening in FIG. 7. The slats 14 also each have a half-notch 30, which is half the width of the full notch 22. The half-notches 30 are orthogonally related to the main notches 26 and are midway located in the full notch and define a passthrough opening in the Z direction.

Finally, the post 16, extending in the Z direction, has a full notch 32. The other post 18, which is the "key" post, is not notched at all, but is a straight piece of square millstock.

The way in which the members fit together to form the joint is as follows: The laths 12 are inserted down through the opening 28 (or in actuality, the slats 14 are placed around the laths so that the opening 28 embraces the laths), so that the opening 24 defined by the laths extends down sufficiently below the opening 28 of the slats to permit the post 16 to be slid into the opening 24 beneath the slats 14. With the slats 14 compressed together, they are then fitted down into notch 32 of the post 16, so that the notch 32 embraces the two slats 14 and holds them together. The post 16 would then extend from the slats 14 as indicated in phantom in FIG. 7.

Thus, there is nothing left but a straight Z-pass-through opening for the "key" post 18 to fit into as shown in FIG. 7. Once the key post is in place, the slats 14 can no longer be raised to release the underlying post 16, and thus there is a locked, rigid orthogonal joint. Conversely, by slipping out the key post 18 (which in the preferred form of the invention makes a very tight press fit), the slats 14 can be lifted up out of the notch 32, to permit the post 16 to be slid longitudinally out of the opening 24, freeing the slats and laths to be separated.

Turning now to the overall construction, the matrix illustrated in FIGS. 1 and 2 is formed from an X-directional parallel array of laths, a Y-directional parallel array of slats, and a Z-directional parallel array of posts.

There are only two types of cuts that need to be made in any of the structural members of the wine rack. First, the full-sized notch cut, which is made in all the members except for the key post 18. Second, the half-notch, which is made after the full-sized notch is made in the slats and in the post 16. With the proper jigs and tooling, obviously these cuts can be very simply and economically made.

The pieces used to construct the wine rack are illustrated in FIG. 10. For each length dimension, the lath has its exact counterpart as a slat. There are thus four of the large laths and slats, eight of the middle-sized laths and slats, and eight of the small laths and slats. And, as can be seen by counting the butt ends of the posts from FIG. 1, there are seventeen of each of the posts 16 and 18. However, because the shortest laths are identical to the posts 16 in the preferred embodiment, there would just be a combined total of 25 of those.

In constructing the rack, although obviously it can be done by hand, a simple way utilizing a framing jig involves first laying out all the laths (X direction) in place for the entire wine rack, possibly with the rack in its upright position as shown in FIG. 13. Then, the slats 14 are all put in place, or put in place slightly displaced from their final position to permit the insertion of the posts 16. Then, the posts 16 are slid in place and the respective slats 14 pressed into place in the notches 32 of the posts. Finally, nothing remains but to slide all seventeen of the key posts into place.

When the joint is completed, there is a void 34 which is defined by the bottom parts of the openings 28 and 24, beneath the solid key post 18 and between the sides of the slats 14 adjacent the half notches. To eliminate this void, the slats could be cut as shown in FIG. 12, with the otherwise full-notch 22 instead being defined by an E-cut 36, which leaves a tongue of wood 38, two of which fill the void 34. This results in a somewhat stronger joint.

In addition to the E-cut 36 in the slat, there are other configurations which would result in the internal void being filled, which will not be expanded upon here.

In either of the embodiments illustrated, the wine rack of the instant invention, as indicated above, is very complex in its conception, at least for a wine rack, but is at the same time conceptually extremely simple in its implementation. When made from oak or other hardwood, it can be finely milled and finished to produce a very strong structure as well as a very attractive piece of furniture which appears to be of relatively intricate construction for the price. At the same time, it is extremely strong and durable, capable of loads, wall mounting, etc. The prototype, made of three-quarter inch nominal dimension soft wood, will withstand the full weight of a person standing on it without any sign of distortion or weakening. In fact, the construction is so strong that the same basic construction can be used to form anything requiring a box-like configuration, even dwelling places.

By increasing the size of the members—for example, from three-quarters inch nominal stock in the model to six-inch or eight-inch square beams—large, strong cubical frames or non-cube shaped box-like spaces, could be defined for an endless variety of uses. FIG. 13 illustrates the basic modular cubic construction that would expand into a variety of useful lattice structures. The stock need not be square, but could be rectangular instead. Additionally, the cubes formed by the stock could be rectangular rather than cubic in two or three dimensions, or the cubic units could be parallelograms rather than cubic or rectangular. Although in some instances strength could be sacrificed, and the interchangeability of these stock would be sacrificed, nonetheless for certain applications diamond-shaped or rectangular "cubes" might work out quite well.

By extending members of the six-piece orthogonal joint and then forming additional joints, all with common members, complex arrays can be created. If eight joints are used to form the orthogonal corners of a cube, then suddenly a very practical structure, with many potential uses, is created. This cubic cell is rigidly bound together and a force applied to one member creates stresses which are shared by all members. By extending members and adding four joints, a second cubic cell can be formed alongside the first which shares four joints with the first cubic cell. Similarly, a third cubic cell can be formed by adding four joints and sharing four joints with the second cell.

In this way, a beam can be formed with structural properties similar to a solid beam, but much lighter. Thus applications include assembly of high strength materials into cubic cell arrays and forming equivalent beams or truss-like formations for structural use where maximum strength with minimum weight is a design criterion. Another advantage is that the strength of these arrays is not dependent on conventional welding techniques currently used with today's materials. This permits the use of materials which are not adapted to welding techniques such as certain tough plastics to be made into beams and other strong multicellular configurations according to the instant disclosure.

I claim:

1. A wine rack comprising:
   (a) a reticulated lattice defining orthogonal X, Y, and Z directions;
   (b) said lattice being comprised of a plurality of elongated structrual members formed into an X-directional parallel array, a Y-directional parallel array, and a Z-directional parallel array;
   (c) said parallel arrays intersecting one another to define a plurality of six-member joints between said elongated structural members and each of said joints including two of said members from each of said X-, Y-, and Z-directional arrays to form said six-member joint, said six-member joint having three elongated structural members that are only full notched, said full notch being substantially equal to two times the cross-sectional area of each of the three elongated members, two of said members having similar full notches and also having an additional half notch, said half notch being formed at ninety degrees to the full notch and substantially at mid-span of the full notch, the sixth elongated structural member having no notches at said joint and is the key post that holds the remaining five members together as a joint; and,
   (d) each of said joints comprising an interlocking joint held together by the interlocking configurations of the elongated structural members themselves such that said lattice is rigid and completely integral without the use of blocks or sockets at the joints, or the use of fasteners or glue at any of the joints.

2. Structure according to claim 1 wherein said lattice is rotated 45 degrees about its Z axis such that said X-and Y-directional parallel arrays are diagonal, and the length of the elongated structural members in said X- and Y-directional arrays are selected such that the peripheral joints of said rotated array fall along the sides of an upright rectangle and the elongated members in the Z-directional arrays span two joints.

3. A structure according to claim 1 wherein each of said elongated structural members is paired with another contiguous structural member to define structural member pairs.

4. Structure according to claim 3 wherein each of the elongated structural members in said X-directional array comprise a lath and each lath has a full notch at each joint with the notches facing one another to define a Z-passthrough opening.

5. Structure according to claim 4 wherein each of the elongated structural members in said Y-directional array comprises a slat and each slat has a full notch at each joint with the notches of the slats facing each other to define an X-passthrough opening, and said laths pass through said openings.

6. Structure according to claim 5 wherein each of said slats has a half-notch cut centrally orthogonally in the side of each of the notches thereof, and said half-notches define Z-passthrough openings, and each of the elongated structural members of the elongated structural member pairs in the Z-directional array comprises a post, a first one of the posts in each pair having a full notch at each joint defining a wide passthrough opening embracing two of said slats in alignment with the half-notches thereof, and the second post of each pair being a key post with no notches, inserted into the joints last to rigidly tie the respective joint together.

7. Structure according to claim 6 wherein some of said elongated structural members having notches therein have additional stock left in the notches to fill the void that would otherwise lie internally of each joint so that a totally solid joint is produced.

8. Structure according to claim 7 wherein each of said full notches in each of said slats is E-shaped to define said additional stock to fill the void that would otherwise be produced.

9. Structure according to claim 6 wherein for every lath there is a slat that is substantially identical except for the additional half-notches cut into the slats.

10. Structure according to claim 3 wherein each of said elongated structural members has a joint region and each of said joint regions has cut into it either no notch at all, a full notch, or a full notch with an orthogonal half-notch centrally cut into the side thereof, such that all of said elongated structural members have only one of the above-stated three configurations at the joint region.

11. Structure according to claim 7 wherein the elongated structural members of the X-dimensional array are all laths with a full notch at the joint region, all the elongated structural members of the Y-dimensional array are slats having at their joint regions a full notch having a half notch centrally cut into its side, and each pair of elongated structural members in the Z-dimensional array comprises both a first post with a full notch at the joint region and a second post with no notches at all.

* * * * *